(No Model.) 4 Sheets—Sheet 1.
E. W. BELL & J. W. MOSER.
CORN HARVESTER.
No. 466,765. Patented Jan. 12, 1892.
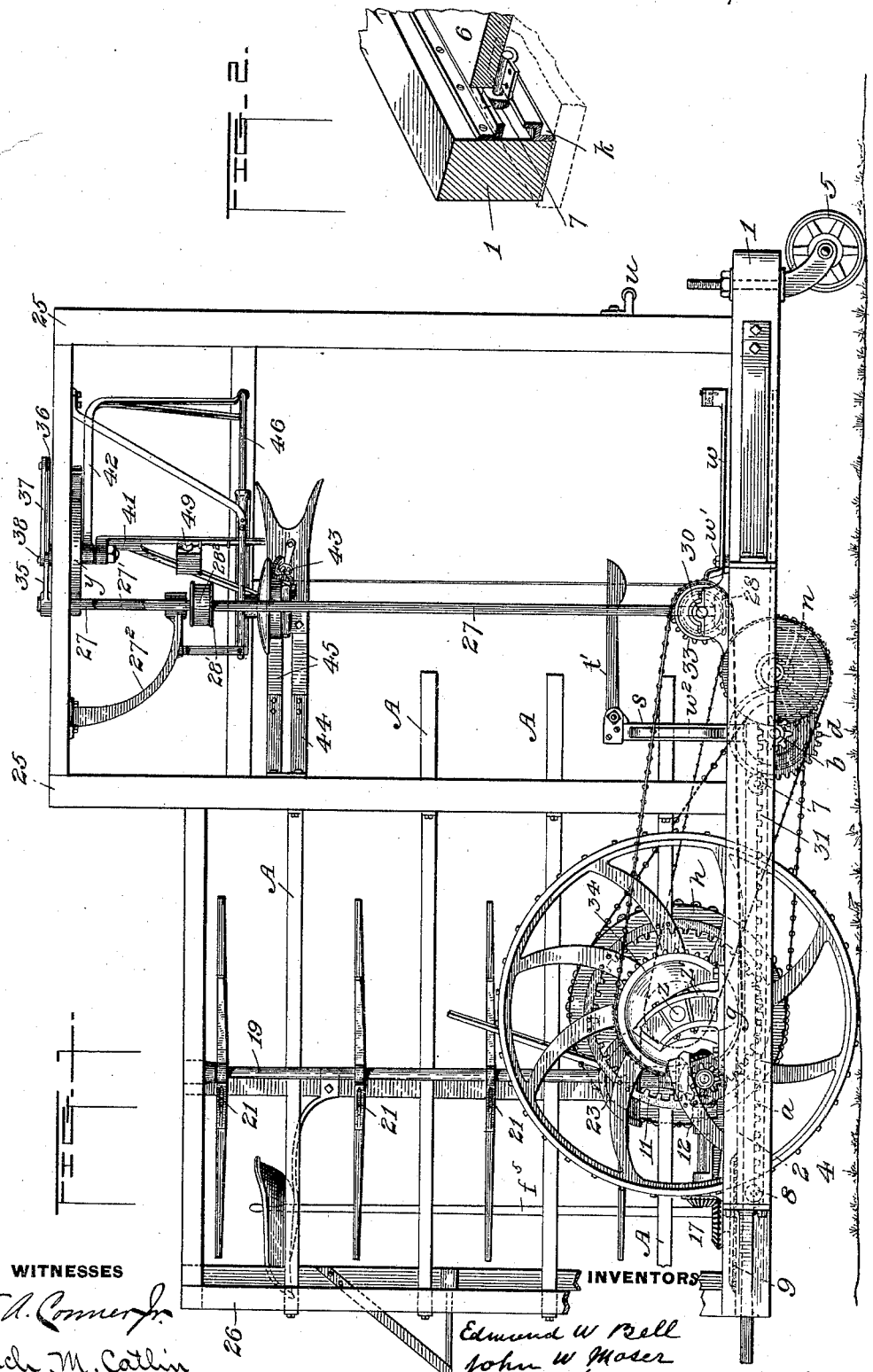
WITNESSES
INVENTORS
Edmund W Bell
John W Moser
by Benj. R. Catlin
Atty.

(No Model.) 4 Sheets—Sheet 2.
E. W. BELL & J. W. MOSER.
CORN HARVESTER.
No. 466,765. Patented Jan. 12, 1892.
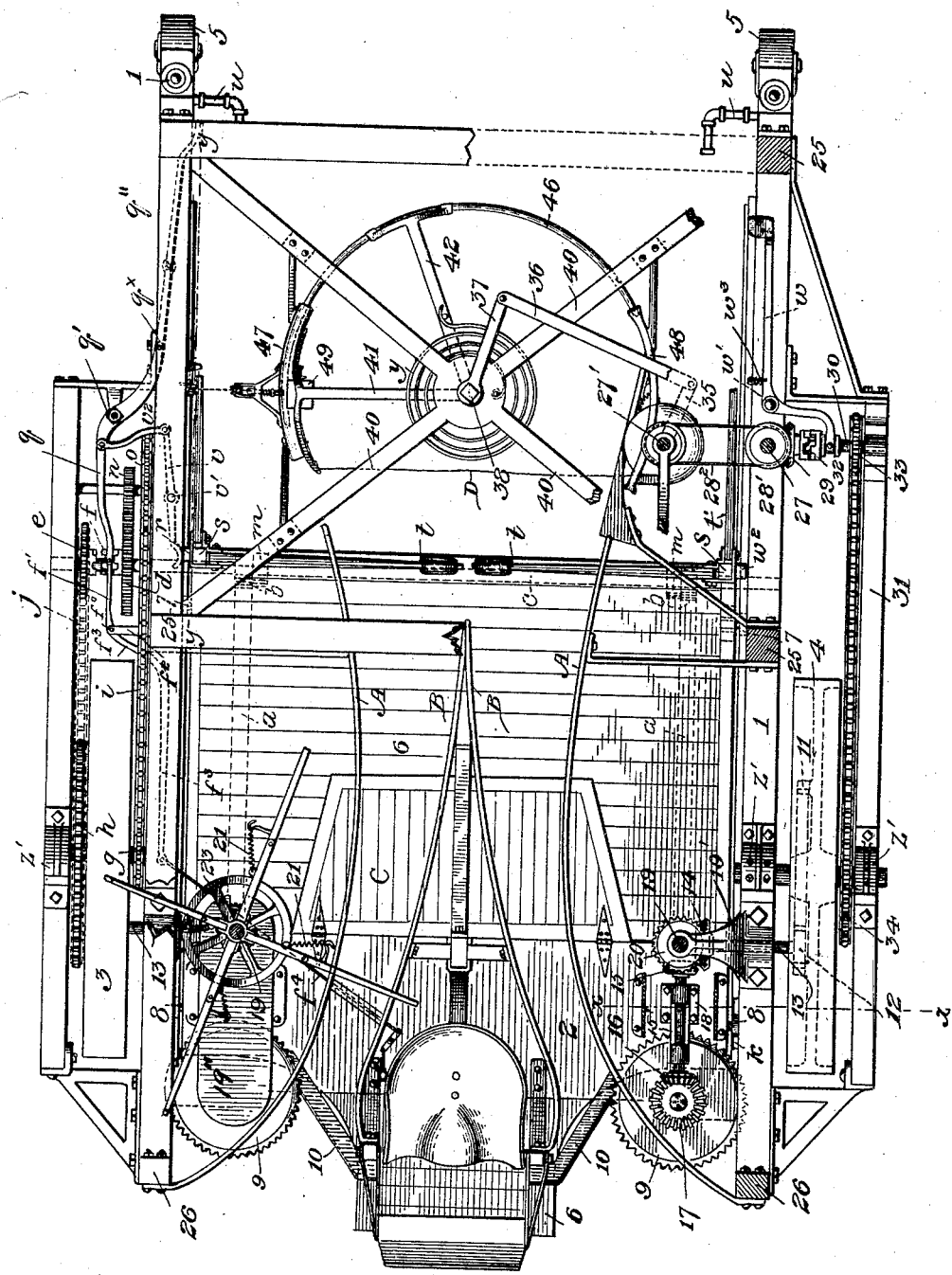
WITNESSES
L. A. Connor Jr.
Arch. M. Catlin.
INVENTORS:
Edmund W. Bell
John W. Moser
by Benj. R. Catlin
Atty.

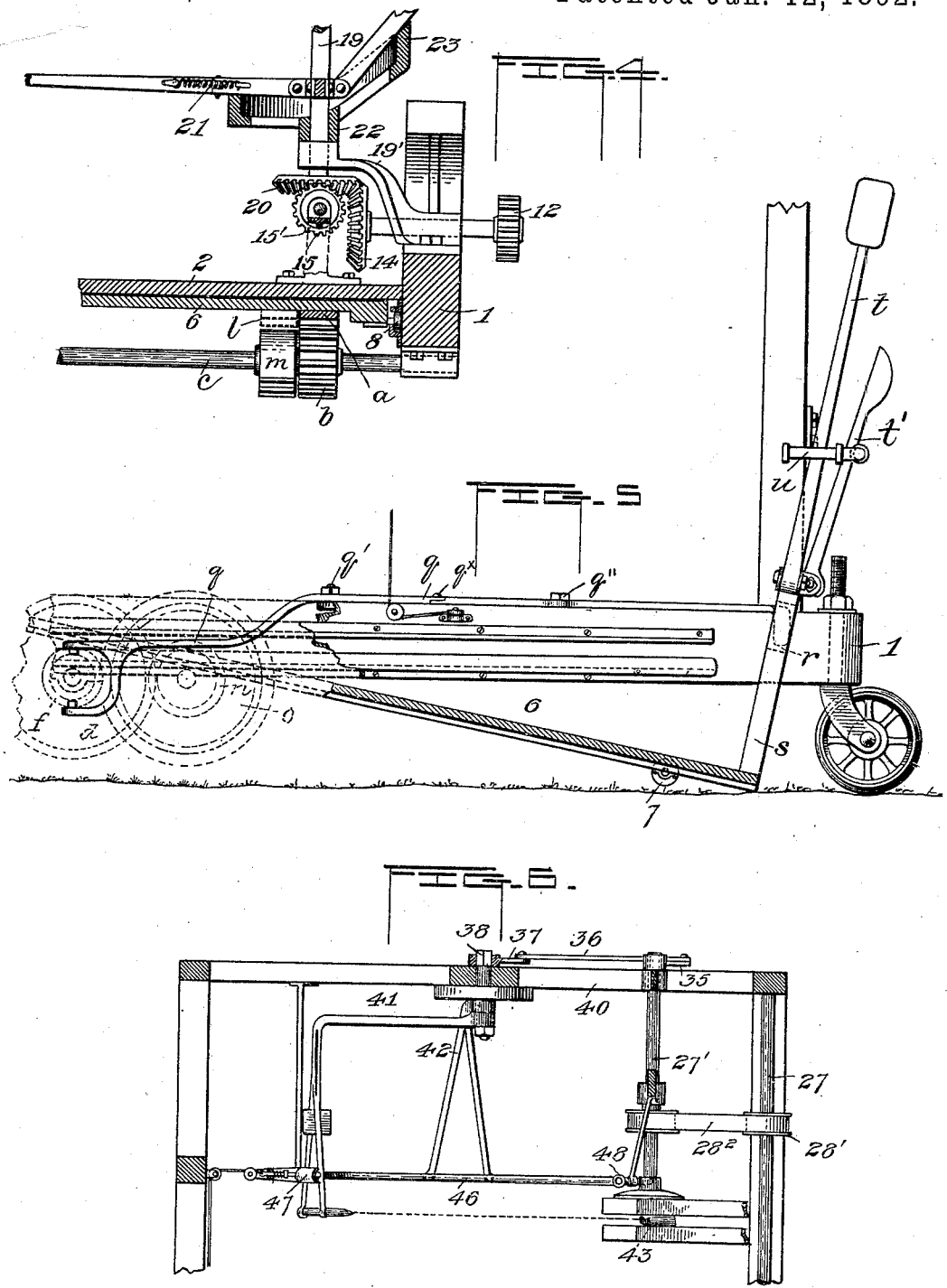

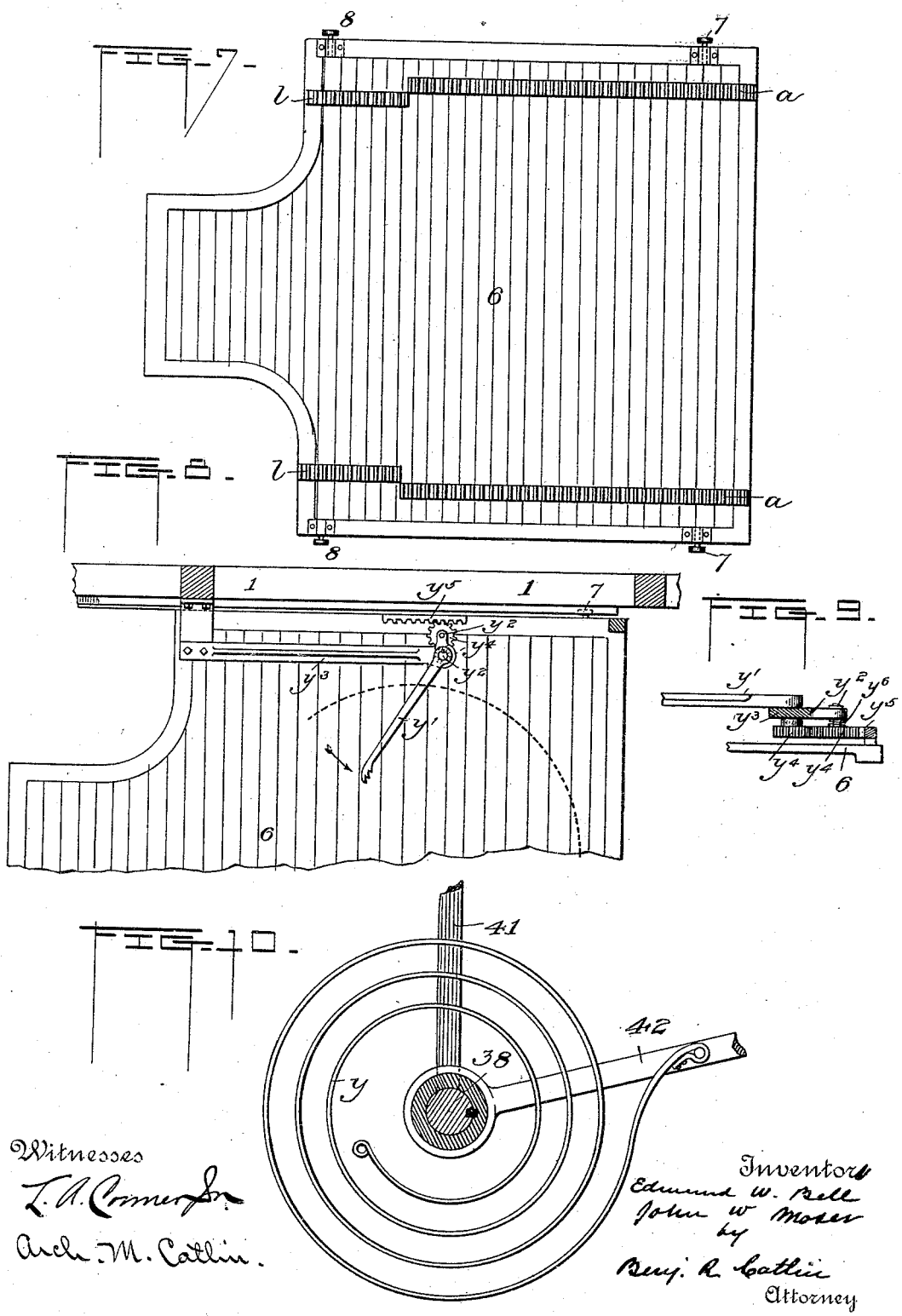

UNITED STATES PATENT OFFICE.

EDMUND W. BELL AND JOHN W. MOSER, OF PAWNEE CITY, NEBRASKA.

CORN-HARVESTER.

SPECIFICATION forming part of Letters Patent No. 466,765, dated January 12, 1892.

Application filed January 28, 1891. Serial No. 379,360. (No model.)

*To all whom it may concern:*

Be it known that we, EDMUND W. BELL and JOHN W. MOSER, of Pawnee City, in the county of Pawnee and State of Nebraska, have invented certain new and useful Improvements in Corn-Harvesters; and we do hereby declare the following to be a full, clear, and exact description of the invention, such as will enable others skilled in the art to which it pertains to make and use the same.

The object of the invention is to provide a corn-harvesting machine which can be driven through standing corn, and cut and bind the same and deliver the bound shocks or bundles in standing position behind the machine; and it consists in the constructions hereinafter described and particularly pointed out.

In the accompanying drawings, Figure 1 is a side elevation of the machine. Fig. 2 is a sectional detail. Fig. 3 is a partial plan, the right-hand side of the figure being partly in horizontal section. Fig. 4 is a vertical section on line $x$ $x$ of Fig. 3. Fig. 5 is a partial section on line $y$ $y$, Fig. 3. Fig. 6 is a partial vertical section on the line $z$ $z$, Fig. 3. Fig. 7 is a bottom plan of movable platform. Fig. 8 is a partial top plan, and Fig. 9 a partial elevation, of mechanism for discharging the shock; and Fig. 10 is a partial plan of a detail.

A main horizontal frame has two side members 1 1, connected at their front by a platform or floor 2, arranged below and forward of the axle, upon which are the main drive-wheels 3 and 4. The rear of each member of the main frame is supported upon a trailing wheel 5, journaled in suitable brackets attached to the frame.

6 indicates a platform adapted to be moved back and forth upon friction-wheels 7 and 8, journaled upon shafts or studs secured, two or more on each side, to platform 6 in any suitable manner.

9 indicates circular and 10 straight edged knives. The latter are secured to the front of the platform 2. The circular knives, which are preferably serrated, rotate upon studs or have short shafts with journals in brackets supported from the frame. The circular knives are rotated by the main driving-wheels 3 and 4, which latter have fixed to them internal spur-wheels 11, gearing with pinions 12 on short shafts 13. Each shaft 13 has a pinion on its inner end meshing with an internal gear 12. On shafts 13, which have suitable bearings in boxes on the bars 1 of the frame, are bevel-gears 14, which drive bevel-gears 20, which latter drive bevel-wheels 15, secured on short horizontal shafts 15', journaled in stud-brackets 18, supported upon the platform 2. (See Figs. 3 and 4.) 19'' indicates a shield or cover for these gears, which shield is shown at the left of Fig. 3, but is cut away by the plane of section at the right of said figure. The gears 16, fast on the front end of shaft 15, drive gears 17, which are fast on the axis of the circular knives, which latter are rotated in horizontal plane by the above-described mechanism.

19 are reel posts or shafts supported in brackets 19', secured to bars 1, and having at the foot of each a bevel-gear 20, which is driven by gear 14, which also drives the circular knives, as described. The reel-arms 24 are pivoted to the posts and at about mid-length are provided with hinged joints.

21 are springs tending to keep the hinges open and the reel-arms extended. The reel-arms are made in hinged sections to adapt them to bend in case their outer ends are obstructed, as by a compact body of cornstalks.

22 are cylindrical collars surrounding the reel-shafts and provided with cam-surfaces 23 on their upper end, adapted to lift the lower arms at suitable intervals to clear the drive-wheels.

As the machine is driven into the corn the rows or hills are cut by the knives and swept over the platform 2 and between the guides A and B onto platform 6, the curvature of the guides A being such that the corn is guided beyond the reach of the reel-arms by fresh accessions of corn pushed across platform 2 and over a hinged leaf C. This leaf is hinged to platform 2, so that its rear edge rests on the platform 6 and rises and falls with it. The corn is supported in standing position on platform 6 by the guides and by the binding-cord at D, against which it is pushed by the reels. Upon the sills or side bars 1 of the frame are supported posts 25 and 26, which are suitably connected by cross-bars, which, together with the bars 1 1 and platform 2 and other connecting bars or rods, as desired, constitute a support for the devices above described and also for a binding mechanism.

27 denotes a vertical shaft suitably supported in the main frame and having at its foot a gear 28, (see Fig. 1,) arranged to be driven by bevel-gear 29, (see Fig. 3,) loose on a shaft 30, journaled in a bar 31 and in bar 1.

32 is a sliding clutch adapted to intermittently lock gear 29 to the said shaft. The latter is driven by sprocket-wheel 33, connected by a chain with a similar wheel 34, made fast on the axis of one of the main driving-wheels.

The binder-shaft 27 has a crank-arm 35, adapted by means of pivoted connecting-rod 36 to move the crank-arm 37 fast on shaft 38, and supported suitably in the diagonal top bars 40 at their junction.

On shaft 38 are made fast a bent needle-arm 41 and a divider-arm 42.

At 43 is located a knotting mechanism, which may be of any suitable form. 44 indicates a supporting-bracket, and 45 are arms attached thereto, which may serve as guides for the needle.

46 is the divider carried by the downwardly-bent portions of the arm 42.

47 is a guide for the divider and needle, which is movable through said guide, and 48 is a sheath suitably formed at each end to receive the point of the divider in either of its extreme positions. 49 is a cord-holder. In the present instance the divider and needle are represented as situated in different planes; but this arrangement is not essential.

The platform 6 is moved backward on the frame as the corn is transferred to it by means of racks $a$, fixed on its under side, which are moved by the pinions $b$, and on shaft $c$, which is supported from the frame and driven by gear $d$ in one direction and in the other by sprocket-wheel $e$, both of which are normally loose on the shaft, except when held by clutch $f$. The gear $d$ and the wheel $e$ are connected with sprocket-wheels $g$ and $h$, respectively, the former indirectly and the latter directly by suitably-arranged chains $i$ and $j$. By means of the sprocket-wheels and gears just named the platform 6 is moved toward the rear while a shock of corn is accumulating on it, said platform being supported by the wheels 7 and 8 in the tracks $k$ in bars 1. The tracks terminate some little distance from the front end of the platform 6, so that the latter will become disengaged and rest momentarily at the time the binding mechanism is brought into action.

$l$ are short racks secured to the bottom of the platform 6 in line with the mutilated gears $m$, these being so arranged on the shaft $c$ that they will not immediately engage the racks $l$ after the pinions $b$ are relieved from racks $a$, but must be first partially revolved. During this pause the corn-shock is bound, and thereupon the gears $m$ engage the short racks $l$ and move the platform 6 still farther to the rear, so that its rear rollers 7 run off the tracks at their rear end and permit the rear of the platform to drop to the ground, while its body is supported upon the tracks by means of the front rollers 8. The shock of corn is thereby deposited upon the ground, whereupon the platform resumes a horizontal position, ready to be sent forward to receive another shock.

The above-described tilting of the platform 6 about the axis of rollers 8 elevates its front end and thereby turns up the hinged leaf C, which thereupon acts as a stop to the freshly-cut corn, which is being pushed back over platform 2 until platform 6 resumes the horizontal position and is rapidly run forward by sprocket-wheels $e$ and $h$ and chain $j$ to receive another shock of corn. This latter operation is effected by the racks and gears above described and by shaft $c$, suitable rotation in the proper direction being given by a clutch mechanism to said shaft.

$f$ is the clutch connected by a spline or feather with the shaft and adapted to engage either the loose sprocket-wheel $e$ or loose gear-wheel $d$. When engaged with gear $d$, which meshes with pinion $n$, made fast on the axis of sprocket-wheel $o$, having a chain connected with wheel $g$, fixed to the main driving-shaft, the above-described return of platform 6 to the frame is effected by the medium of the pinions and gears under said platform.

The clutch $f$ is automatically moved and its operations timed to clutch wheel $d$ to its shaft for the return of the platform by means of compound clutch-shifting rod $q$, having fulcrums $q'q''$. The rod $q$ is made in two parts, hinged to each other at $q^x$. When the cam $r$ engages the rear end of lever $q$, as indicated in Fig. 5, the adjacent lever-section is moved about $q''$, being carried inwardly at the point $q^x$, which has the effect to move the forward section of the compound bar or lever $q$ about the point $q'$ and throw its forward end outwardly, thereby engaging the clutch at $f'''$.

$r$ is a cam on a post $s$, which is supported on the rear end of the platform, the cam and compound lever $q$ being so arranged and adjusted that the free arm of said lever will be moved outwardly by the cam when the rear end of the platform drops. This engages clutch $f$ with wheel $e$ and begins the reverse movement of the above-described mutilated gears, whereby after a short pause the platform is moved forward, so that gears $b$ engage racks $a$, and thereupon the forward movement of the platform is completed. The rear end of the platform is raised to permit the forward movement by the counterbalancing arms of levers $t$, which are hinged to posts $s$ and have fulcrums on the arms $u$. Said levers $t$ are normally supported above the platform $b$ at the rear and in horizontal position, and are moved to a position above arms $u$ on the frame-posts upon which they rest when the platform drops, whereby they are turned on their hinges and their weighted ends raised, as indicated. The arms, when platform D is at its forward position, are held horizontally in a transverse position, as indicated, and aid in supporting the corn. They are raised to the position shown in Fig. 5 by the weight of the shock and platform, and when the shock is discharged their weighted ends counterbalance the platform and raise it to a horizontal position. The levers $t$ are weighted, as indicated, and are sufficient to lift the platform from the ground under ordinary conditions. Additional levers $t'$, extending rearwardly, serve to insure and accelerate the rising of the platform as it approaches the horizontal plane, and these levers $t'$ are also adapted to be operated by hand. They may be weighted, as indicated.

The clutch $f$ is shifted to put wheel $d$ in motion to move the platform to the rear by means of the aforesaid cam $r$ at the time the posts $s$ and the platform have reached their extreme forward movement by means of the lever $v$, pivoted at $v'$, and connected by pivoted link $v''$ to the lever $q$. (See Fig. 3.) $f'$ indicates a lever having a fulcrum at $f°$ on a bracket $f^2$. The short arm of lever $f'$ engages the clutch and the long arm is extended to $f^3$, where it is pivoted to connecting-rod $f^4$, adapted to be moved in either direction by the hand-lever $f^5$. By these means the clutch $f$ can be disengaged from both sprocket-wheel $e$ and gear $d$ and the platform remain at rest relative to the rest of the machine while the latter is in motion. The binding mechanism is automatically brought into action by means of the rod $w$, pivoted at $w'$, said rod being connected to the clutch 32, splined to slide on shaft 30, so as to engage the clutch fixed to gear 29, which meshes with bevel-gear 28, fast on shaft 27. The lever $w$ is moved to effect this operation by the cam $w^2$ on one of the posts, which cam strikes the free end of lever $w$ before the platform 6 reaches its most rearward position. The shaft 30 is the axis of the sprocket-wheel 33, which is driven by a sprocket-chain from a sprock-wheel 34, fast on the axle of driving-wheel 4. The clutch 32 is disengaged by a spring $w^3$, after lever $w$ is released from the cam $w^2$.

The above-described rotation of shaft 27 operates the binder as follows: On this shaft 27 is a pulley $28'$, connected by band $28^2$ with a pulley fast on a short shaft 27, supported in bracket $27^2$. The rotation of this shaft moves the arm 35, connecting-link 36, arm 37, and shaft 38, and the divider and needle supporting arms 42 and 41, whereby the divider and needle are moved about a portion of the corn. The needle carries the cord from the cord-holder 49 between the guides 45 to the knotter 43, by which it is fastened and cut, as usual, in binders, the free end of the cord being held therein until the next shock is bound. The needle and divider are held during the knotting operation by a spring-bolt $x$, engaging a socket in the divider. This bolt is suitably released by a cord $x'$ and a tripping-lever $x^2$, engaging a projection $x^3$ on the post $s$ as the platform and its post are moved back toward the front after discharging a shock. As soon as the bolt is withdrawn the spring $y$ returns the divider and the movable connected posts to their initial position. This spring is made of suitable strength and has one end fast to the frame, while the other is secured to the divider-arm 42. It is put under tension when the needle and divider are operated and is held under tension until the divider is released from bolt $x$. The cord which is carried to the knotter and tied above the shock being cut and the free end held during the return of the needle remains stretched across the space between the knotter and the needle, and the corn that is to form the succeeding shock is carried against it with sufficient force to overcome the tension-spring in the holder, so that the cord is pushed back as the corn and the platform move to the rear until the needle is moved about the new shock, carrying the cord around the opposite or front side of the new shock, whereupon it is bound, as before. The binding occurs before the platform has completed its rearward movement. The shock will ordinarily be discharged by gravity when platform 6 is dropped, the forward motion of the machine withdrawing the platform so as to permit its ascent. The discharge of the shock may be further aided, if necessary, as may be the case on even ground, by revolving arms $y'$, one on each side of the machine, operated by means of pinions on studs $y^2$, supported in brackets $y^3$, made fast to bars 1. These pinions mesh with gear-wheels $y^4$, that are revolved by racks $y^5$, fast on the platform 6. These parts are so arranged as to bring the arms into operation at about the moment of binding and immediately thereafter. The arms are returned to their initial position by the reverse movement of the platform, such position being outside of guides A. To provide against failure of the gears $y^4$ to engage the racks $y^5$, said gears are splined to their shafts and normally held at the end of said shafts in a yielding manner by springs $y^6$. If when the platform rises it should happen that the gear and rack do not at once engage, the former will be held against the upper side of the teeth of the rack until a slight forward movement permits the springs, which in such case have been compressed by the ascending platform, to push the gears into the proper plane for engagement with the rack.

The gist of our improvement, so far as relates to the shock-discharging arms, does not consist in the particular mechanism illustrated in the present instance for moving the arms.

The main frame may be vertically adjusted to cut the corn at different heights by means of the bearing-boxes $z$ of the driving-axle, made adjustable in supporting-brackets $z'$, having a curved form, of which the axial line of pinion 12 is the center. These brackets are supported from the bars 1, and the bearing-boxes are adapted to be secured at different altitudes by removable bolts.

Our machine is adapted to cut corn, cane, sorghum, and the like. It is intended to be drawn by three horses abreast, each walking between two rows of corn; but any suitable means or arrangement may be used. Parts of the mechanism can be varied by mechanical skill, provided substantially the same principles of operation and construction are employed, without departing from the invention. In some cases, for example, it is proposed to attach the divider-arm to a sleeve on shaft 27, and to provide a pin on the shaft movable through a slot in the sleeve for about one-third of a revolution, whereby the divider may be independently moved. It will also be understood that the usual mechanical equivalents can be substituted for the gearing, counterbalancing-levers, operating-levers, or other parts, and such are not necessary to be described or particularly pointed out.

Having thus described our invention, what we desire to secure by Letters Patent is—

1. In a corn-harvester, the main frame supported upon the axles of the main wheels and provided with trailing wheels and with a floor 2, and a platform located below, and mechanism for moving said platform directly back and forth, platform C, hinged to said floor and extending over said movable platform, and devices for moving corn onto the same, substantially as set forth.

2. In a corn-harvester, the main frame supported upon the axles of the main wheels and provided with trailing wheels and with a floor 2, and a platform located below, and mechanism for moving said platform directly back and forth, platform C, hinged to said floor and extending over said movable platform, and devices for moving corn onto the same, and devices for positively moving the corn therefrom, substantially as set forth.

3. The combination of the main frame, corn-cutting knives, devices for moving the corn across the frame, guides to direct the corn, mechanism for binding the corn, and a movable tilting platform adapted to receive the corn from the main frame and deposit it on the ground, and mechanism for moving said platform directly to the rear after the binding operation, substantially as set forth.

4. The combination of the main frame or platform, the apron hinged thereto, the tilting platform movable in a plane under the main platform directly to the rear and provided with devices operative at or near the rear position of said movable platform to tilt the same, the forward edge of the said movable platform being adapted to turn the apron on its hinges, and mechanism for moving the corn against the hinged apron, substantially as set forth.

5. The combination of the main frame provided with knives, the reels, the guides extending to the rear beyond the reach of the reel across the movable platform, mechanism for moving said platform to the rear, and the corn-supporting arms attached to said platform, substantially as set forth.

6. The combination, in a corn-harvester, of the driving-wheels and the main frame, the movable platform 6, binding mechanism, and gearing intermediate the platform and said mechanism, whereby the latter is operated by the movement of said platform, substantially as set forth.

7. The combination, in a corn-harvester, of the main frame, the movable platform 6, mechanism adapted to move said platform in a plane below the top of the main frame directly to the rear, and devices for lowering its rear end, and a shock-discharging mechanism operative during the rearward movement of the platform, substantially as set forth.

8. In a corn-harvester, the main frame supported upon the wheels, the movable platform provided with racks $a$ and $l$, and the shaft $c$, gearing to suitably revolve said shaft, pinions $b$, and the segmental gears $m$ on the same, meshing with said racks $a$ and $l$, respectively, all in combination with the binding mechanism, whereby the platform rests during the binding, substantially as set forth.

9. The combination, in a corn-harvester, of the vehicle, the main frame, the platform 6, movably supported on said frame, the rear of said platform being adapted to drop to the ground when suitably moved, gearing for effecting said movement, and counterbalancing mechanism adapted to raise the platform when the shock is discharged therefrom, substantially as set forth.

10. In a corn-harvester, the main frame, the driving-wheels, the shaft $c$, provided with gears driven from the main axle in opposite directions, a clutch on said shaft, levers for shifting the clutch to engage the alternative gears, the platform provided with racks meshing with pinions on said shaft, and cams or projections on the platform to automatically operate the levers and shift the clutch, substantially as set forth.

11. In a corn-harvester, the main frame supported on the main axle and provided at its rear with trailing wheels, and a floor 2, the platform normally supported on said frame, mechanism for moving the platform back and forth on the main frame, platform C, hinged to said floor and extending over the movable platform, devices for cutting corn and pushing it onto the platform, and binding mechanism supported directly above the path of the platform, substantially as set forth.

12. The combination, in a corn-harvester, of the main frame, the platform movable thereon, the binding mechanism supported above the path of the platform, a shaft supported in the harvester-frame, provided with a gear forming part of said binding mechanism, a clutch having one half secured to said gear and loose on said shaft and having its other half connected by a feather to and movable on the shaft and adapted to engage said fixed clutch, means for revolving said shaft, a lever for moving the sliding half of the clutch, and a cam or projection on the platform arranged to move the lever to suitably clutch said gear of the binding mechanism, substantially as set forth.

In testimony whereof we have signed this specification in the presence of two subscribing witnesses.

EDMUND W. BELL.
JOHN W. MOSER.

Witnesses:
J. K. GOUDY,
W. W. GRIFFIN.